219-121 SR
11/16/76    XR    3,991,930

United States Patent [19]
Ekerot

[11] 3,991,930
[45] Nov. 16, 1976

[54] METHOD FOR PRODUCING A MULTI-LAYER METAL STRIP AND METAL STRIP PRODUCED ACCORDING TO SAID METHOD

[75] Inventor: Sven Ekerot, Fagersta, Sweden

[73] Assignee: Fagersta Aktiebolag, Fagersta, Sweden

[22] Filed: Sept. 22, 1975

[21] Appl. No.: 615,247

[52] U.S. Cl. .................. 228/263; 219/137 WM; 219/121 EM; 76/112; 75/126 C; 75/126 G
[51] Int. Cl.² .................. B23K 15/00; B23K 35/22
[58] Field of Search ............ 228/263; 219/121 EM, 219/137 WM; 75/126 G, 126 C; 76/112

[56] References Cited
UNITED STATES PATENTS

| | | | |
|---|---|---|---|
| 2,759,249 | 8/1956 | Eberle | 228/263 X |
| 3,034,379 | 5/1962 | Bernstein et al. | 76/112 |
| 3,063,310 | 11/1962 | Connoy | 76/112 |
| 3,295,966 | 1/1967 | Steven | 75/126 C |
| 3,315,548 | 4/1967 | Anderson et al. | 76/112 |
| 3,679,400 | 7/1972 | Nachtman | 75/126 G X |
| 3,926,622 | 12/1975 | Kiyonaga et al. | 75/126 C X |

*Primary Examiner*—Al Lawrence Smith
*Assistant Examiner*—K. J. Ramsey
*Attorney, Agent, or Firm*—Lerner, David, Littenberg & Samuel

[57] ABSTRACT

A method for producing a multi-layer metal strip comprising at least one strip of a high-speed steel alloy which in addition to iron and normal impurities contains 0.60–1.30 % C, 3.0–5.0 % Cr, 1.0–10 % Mo, 1.0–20 % W, up to 12 % Co and 0.5–4.0 % V, and which is cemented onto a carrier strip by electron-beam welding. In order to attain a good flow of the molten metal in the gap between the high-speed steel strip and the carrier strip 0.005–0.5 % Ce is added to the high-speed steel alloy. Ce can be added as a "misch metal" and may then contain the lanthanides normally present in misch metal. The multi-layer metal strip thus produced is used in the manufacture of hacksaws.

3 Claims, No Drawings

METHOD FOR PRODUCING A MULTI-LAYER METAL STRIP AND METAL STRIP PRODUCED ACCORDING TO SAID METHOD

This invention relates to a method for producing a multi-layer metal strip wherein at least one strip of a high-speed steel alloy which in addition to iron and normal impurities contains 0.6–1.30 % C, 3.0–5.0 % Cr, 1.0–10 % Mo, 1.0–20 % W, up to 12 % Co and 0.5–4.0 % V, is cemented onto a carrier strip by welding, especially electron-beam welding.

More particularly the invention relates to a method for producing a bimetal strip which contains a strip of a high-speed steel alloy which is especially suited to be combined by welding with a carrier material. The bimetal strips which are utilized e.g. for manufacture of sawblades, consist of a carrier strip constituting the major part by volume of the bimetal strip, and a high-quality steel, such as high-speed steel, for example, joined together with the carrier strip. The joining together of these two materials is effected usually by electron-beam welding.

The welding step is a critical operation, and for obtaining good quality it is of great importance how the molten metal flows in the gap between the high-speed steel and the carrier strip. The metal flow is dependent on the viscosity and the surface tension of the melt. These properties are affected to a substantial degree by the oxygen and sulphur content of the melt.

The main object of the invention is to provide a method which in the welding step, in particular when carried out as electron-beam welding, permits higher welding speed than hitherto in the cementing together of the high-speed steel alloy and the carrier strip. Such an increase of the welding speed has improved flow of the melt metal in the gap between the high-speed steel and the carrier strip as a primary condition.

To attain said object the method of the invention is characterized by the feature that 0.005–0.5 % Ce is added to the high-speed steel alloy. In this connexion, Ce may be added as a misch metal, the high-speed steel alloy being allowed to contain also the lanthanides normally present in misch metals.

In addition to the advantage that the welding step by means of a high-speed steel alloy according to this invention can be carried out more rapidly than conventional welding, both the upper and the lower surfaces of the weld seam obtain a more uniform appearance and the material in the weld zone retains is good properties, primarily its hot ductility and good properties in transverse direction.

In tests carried out according to this invention the high-speed steel had a basic composition of 0.90 % C, 0.35 % Si, 0.32 % Mn, 4.0 % Cr, 0.05 % Ni, 5.0 % Mo, 6.2 % W, 2.0 % V, 0.025 % P, 0.027 % S, the remainder being iron and impurities normally present in high-speed steel. This basic analysis was varied with different contents of Ce admixed to the alloy in the form of misch-metal. The contents of Ce amounted to, respectively, 0.023 %, 0.028 % 0.035 %, 0.07 %, 0.14 %, 0.17 %, 0.19 % and 0.24 %.

The high-speed steel alloys having the aforesaid compositions where cemented by welding onto a backing material having the following chemical composition: 0.45 % C, 4.2 % Cr, 0.85 % Mo, 0.15 % V, the remainder being iron and usual impurities.

The speed of the electron-beam welding could now be increased by about 35 % for a thickness of the back material of 0.635 mm and by up to 100 % for a thickness of said material of 0.889 mm, compared with a conventional high-speed steel. It was established that it was possible in the welding of bimetal strips for band saws (25.4 by 0.889 mm) to increase the speed of welding from 6 meters per minute to 12 meters per minute and for handsaws (12.7 by 0.635 mm) from 9.5 to 12 meters per minute without any cavities and undercuts or other faults appearing in the weld seam. In addition, the high-speed steel possessed good adhesion to the carrier strip.

The invention also relates to the metal strip, in particular the bimetal strip produced according to the method of the invention.

The bimetal strips produced according to the invention are subsequently annealed, rolled, straightened and tempered, and in the final control they showed excellent values of strength in the weld seam, the high-speed steel and the carrier strand.

The invention furthermore relates to a hacksaw manufactured from the combined metal strip produced according to the invention.

All per cent values stated above and appearing in the appended claims relate to per cents by weight.

I claim:

1. A method for producing a multi-layer metal strip wherein at least one strip of a high-speed steel alloy which in addition to iron and normal impurities contains 0.60–1.30 % C, 3.0–5.0 % Cr, 1.0–10 % Mo, 1.0–20 % W, up to 12 % Co and 0.5–4.0 % V is cemented onto a carrier strip by welding, characterized in that 0.005–0.5 % Ce is added to the high-speed steel alloy.

2. A method according to claim 1, characterized in that Ce is added in the form of misch metal, the high-speed steel alloy being allowed to contain also the lanthanides normally present in misch metal.

3. The method according to claim 1 wherein said high-speed steel strip is cemented onto said carrier strip by electron-beam welding.

* * * * *